United States Patent [19]
Soref

[11] 4,385,799
[45] May 31, 1983

[54] DUAL ARRAY FIBER LIQUID CRYSTAL OPTICAL SWITCHES

[75] Inventor: Richard A. Soref, Newton Centre, Mass.

[73] Assignee: Sperry Corporation, New York, N.Y.

[21] Appl. No.: 163,125

[22] Filed: Jun. 26, 1980

[51] Int. Cl.³ .............................. G02B 5/172
[52] U.S. Cl. .............. 350/96.19; 350/96.13; 350/334; 350/347 V
[58] Field of Search ............ 350/96.13, 96.14, 96.15, 350/96.16, 96.19, 96.20, 334, 347 V, 330

[56] References Cited

U.S. PATENT DOCUMENTS

| | | | |
|---|---|---|---|
| 4,120,560 | 10/1978 | Baues et al. | 350/96.14 |
| 4,201,442 | 5/1980 | McMahon et al. | 350/96.14 |
| 4,278,327 | 7/1981 | McMahon et al. | 350/347 V |

OTHER PUBLICATIONS

Applied Optics, vol. 12, No. 10, Oct. 1973, pp. 2309-2311, Kashow et al., "Total-Reflection Liquid--Crystal Electrooptic Device".

*Primary Examiner*—John D. Lee
*Assistant Examiner*—Frank Gonzalez
*Attorney, Agent, or Firm*—Howard P. Terry

[57] ABSTRACT

The invention pertains to improved electrooptical devices for switching pluralities of unpolarized or polarized optical signals between input and output multimode single strand fiber optical guides and more particularly relates to novel electrooptical switch elements employing electric field-effect liquid crystal compositions adaptable for the construction of large scale, integrated multiple switch arrays.

15 Claims, 11 Drawing Figures

DUAL ARRAY FIBER LIQUID CRYSTAL OPTICAL SWITCHES

BACKGROUND OF THE INVENTION

1. Field of the Invention

The invention pertains to improved electrooptical devices for switching pluralities of unpolarized or polarized optical signals between input and output multimode singlestrand fiber optical guides and more particularly relates to novel electrooptical switch elements and matrices employing electric field-effect liquid crystal compositions and adaptable for the construction of large scale, integrated multiple switch arrays.

2. Description of the Prior Art

It has been proposed to use nematic liquid crystal materials in unit optical switches; but generally, the single switch configurations proposed have inherent geometric and other properties making them not particularly useful for combination in simple optical multiple switch matrices. Nonetheless, liquid crystal materials are characterized by large changes in optical index of refraction for only modest changes in the electric field at relatively low electric field magnitudes and have other significant advantages, as are discussed widely in the literature and, for instance, in the U.S. patent application Ser. No. 947,983, now U.S. Pat. No. 4,201,442, by D. H. McMahon and R. A. Soref and for a "Liquid Crystal Switching Coupler Matrix", filed Oct. 2, 1978 and assigned to Sperry Corporation.

The faults of the prior art are further discussed in the R. A. Soref U.S. patent application Ser. No. 13,095, now abandoned, for "Liquid Crystal Switching Matrices", filed Feb. 21, 1979 and assigned to Sperry Corporation. The Soref invention provides novel electrooptical matrix switches for selectively switching pluralities of optical signals between collimating output fiber light guides of the multimode, single strand kind. Switching is accomplished by selective electric field excitation of positive or of negative anisotropy liquid crystal media. The geometry of the multiple switch structure may be regarded as a hybrid between the modular and nonmodular; in certain forms of the invention, sets of similar trapezoidal prismatic glass parts are economically employed and, between those glass prisms, thin planar liquid crystal layer cells are defined which include a plurality of active electrooptic regions. The complete configuration may have one or more degrees of geometric symmetry. The assembly of prisms and liquid crystal layers may cooperate, for example, in directing light signals from three inputs to selected ones of three outputs, while certain of the prisms cooperate with light absorbers for removing unwanted scattered light.

Also of interest is the related R. A. Soref U.S. patent application Ser. No. 97,294, now U.S. Pat. No. 4,278,327, for "Improved Liquid Crystal Matrices", filed Nov. 26, 1979 and assigned to Sperry Corporation. The invention again relates to improved electrooptic devices for switching unpolarized or polarized optical signals between input and output multimode singlestrand optical wave guides, unit switches employing electric field effect liquid-crystal compositions and adaptable to the construction of large scale, integrated multiple switch arrays. Switching is accomplished by the selective electric field excitation of liquid crystal media confined in layers between prismatic glass elements supporting a plurality of cooperating mirror and transparent electrode systems. Switching is accomplished by means provided for rendering operation efficiently independent of the particular polarization of the incoming light. Some forms of the invention further benefit because the selected liquid crystal material, in cooperation with the selected disposal of mirrors and optically active regions defined between active transparent electrodes, makes it possible to use only one type of liquid crystal material throughout each liquid crystal layer, eliminating the need for internal separating barriers and for an inert index-matching liquid employing such barriers to separate the liquid from the liquid crystal material.

While electrooptical switches of the foregoing types are attractive for use in many applications, certain of these devices require large pluralities of high index ground glass prisms, as well as of intervening liquid crystal cells, leading to relatively high manufacturing cost. While utility in matrices is demonstrated where the number of switching possibilities is low, excessive cost begins to result when the number of switching elements is considerably expanded. Also, certain of the prior art devices suffer from cross-talk levels that are sometimes higher than the desirable theoretically predicted values and that are not equal in both the excited and unexcited states of each switching element. Accordingly, it is the primary objective of the present invention to supply efficient multimode optical matrix switches that route light from multiple fiber inputs to multiple fiber outputs in response to electrical command signals, reciprocal compact matrix switches which may accommodate many inputs and many outputs with further minimized cross-talk and optical insertion losses.

SUMMARY OF THE INVENTION

The invention comprises novel improved liquid crystal electrooptical switching matrices for switching pluralities of unpolarized or polarized optical signals between plural input and plural output, multimode, single strand fiber optical guides. The structure involves a pair of replicated 1 by N switching prism sections, one section being supplied with M inputs and the other or inverse section with N outputs. The switching sections are rotated one with respect to the other by 90° about an axis of an intermediate prismatic system for coupling the light beams from the input matrix switch to the output matrix switch. In a preferred form, only two liquid crystal cells and only three glass prisms are required.

DESCRIPTION OF THE PREFERRED EMBODIMENTS

The multimode optical switches of the present invention, like those of the aforementioned patent applications, employ the electric field switching properties of thin planar films of aligned liquid crystals in nematic media when disposed between cooperating pairs of transparent bodies made of glass of a high index of refraction. The optical refractive index $n_g$ of the glass bodies or prisms 1 and 5 (FIG. 1) is selected to be greater than the ordinary refractive index $n_o$ of the thin liquid crystal film 4. The value of $n_g$ may be equal to, slightly less than, or slightly greater than the extraordinary index $n_e$ of the liquid crystal medium of film 4. The opposed flat, polished surfaces of the glass prism bodies 1, 5 at the interfaces with the liquid crystal film 4 may be supplied with respective opposed thin optically-transparent, sputtered, electrically-conducting layers 2, 3, preferably of indium-tin oxide prepared in the usual manner in thicknesses of 300 to 500 Angstroms. Thin films of other materials, including chromium, have also been used to form electrodes in such liquid crystal display cells. Microgrooves (not shown) may be formed in the conventional way on exposed surfaces of an insulator material such as SiO or $MgF_2$ by 60° angle-deposition of 200 Angstroms of SiO or $MgF_2$ on the electrode films 2, 3 so as to enhance uniform homogeneous ordering of the long liquid crystal molecules, especially for positive anisotropy liquid crystal materials, in a preferred direction in the absence of the electric field V. Alternately, a small amount of a conventional surfactant material or a 500 Angstroms coating of $CaF_2$ may be used to achieve the homeotropy desired in negative liquids. When a control electric field V is applied between conductive electrodes 2, 3, the effect of the presence of the field in the liquid crystal medium is to reorder the long axes of most of the liquid crystals, except for a negligibly small portion of the molecules at the surfaces of films 2, 3. The reorientation of the molecules causes the liquid crystal film to present a new refractive index to the light of a typical light ray or beam 6.

Figure 1:
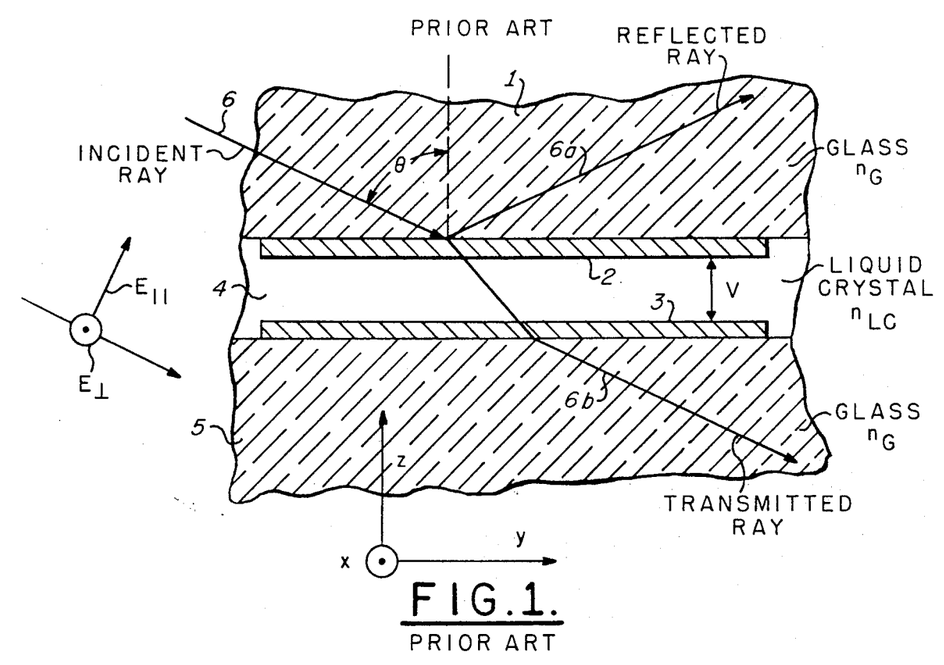
FIG. 1 is a fragmentary cross section view useful in explaining the operation of the invention.

Basically, the incoming collimated light beam 6, incident at an acute angle $\theta$ at electrode 2, is caused by the control signal V to be reflected as light beam 6a or to traverse liquid crystal film 4 as light beam 6b. The critical angle $\theta_c$ for total internal reflection of incident light beam 6 is governed by the ratio $n_{LC}/n_g$ and depends both upon the applied field V and the optical polarization $E\perp$ or $E\parallel$. If the optical incidence angle $\theta$ is greater than $\theta_c$ (at V=0), the incident beam is reflected as beam 6a; if not, the incident beam penetrates the liquid crystal film 4, exiting via glass sheet 5 as beam 6b. Since the thicknesses of films 2, 3, 4 are each very small, the actual deviation of the exit beam 6b is also very small. One or both polarizations are totally reflected at V=0.

Operation of the prior Soref arrangement of FIG. 1 further depends upon the nature of the selected liquid crystal material or composition, particularly depending upon whether it demonstrates positive or negative dielectric anisotropy. In materials with positive dielectric anisotropy, the long axes of the nematic fluid molecules generally align themselves along the applied electric field. On the other hand, in materials with negative dielectric anisotropy, the major portion of the long axes generally tend to dispose themselves at right angles to the electric field vector.

Figure 2A:
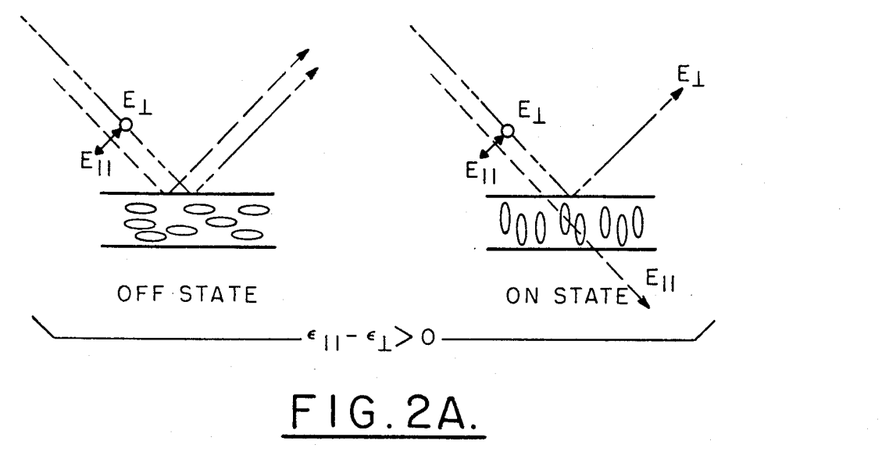
FIGS. 2A, 2B, and 2C are simplified cross sectional views similar to FIG. 1 and are also useful in explaining the invention.
Figure 2B:
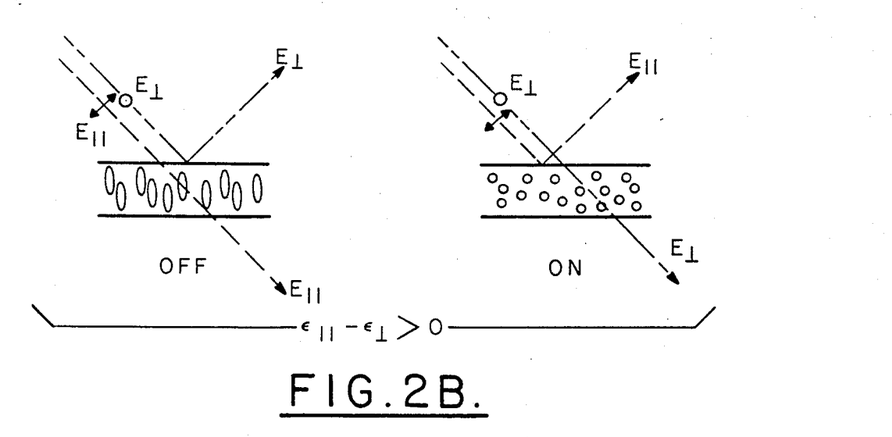
Figure 2C:
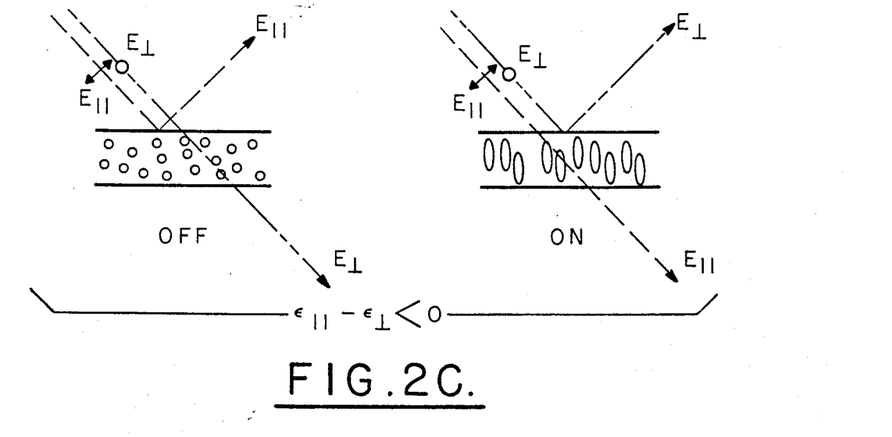

Referring to FIGS. 2A, 2B, 2C, several types of orientations of the long axes of the nematic crystals are useful in the invention. Optical paths are illustrated for the two polarizations of the incident light ray, $E\parallel$ representing light polarized in the optical incidence plane and $E\perp$ representing light polarized normal to the latter plane. FIG. 2A illustrates the off and on states for a positive dielectric anisotropy liquid crystal whose unexcited order is with the long axes of its molecules both parallel to the substrate interface and parallel to the optical incidence plane. In this condition, both polarizations are totally reflected with no applied voltage. With a full excitation placed between the transparent electrodes, the long molecular axes become perpendicular to the electrodes and only $E\parallel$ light is transmitted through the nematic layer. For negative dielectric anisotropy liquid crystals, as in FIG. 2B, the molecular axes are normally aligned orthogonal to the electrodes; when an excitation voltage is applied, the molecular axes swing parallel to the electrodes. Here, only the $E\parallel$ polarization is transmitted in the off state, whereas only the $E\perp$ polarization is transmitted in the on state.

With appropriate treatment of the electrode surfaces, the FIG. 2B operation with respect to applied voltage is reversed in FIG. 2C where the nematic fluid has positive dielectric anisotropy. In FIG. 2C, the zero voltage order is parallel to the walls and normal to the light plane, while the order in the presence of an excitation voltage is normal to the electrodes and parallel to the light plane. Consequently, the $E\perp$ polarized component is transmitted with no excitation present and the $E\parallel$ component is transmitted in the presence of that voltage. The novel switches yet to be described depend upon the use of nematic materials having the properties exhibited in FIGS. 2A, 2B, and 2C. Furthermore, one could use 90° twisted nematic or hybrid alignments for the liquid crystal, but the switching characteristics happen to be equivalent to those of FIG. 2A for oblique incidence.

The invention makes use of a reversed pair, prior art matrix switching system coupled together by an intermediate prism device acting to couple the multiple outputs of the input switching device to the multiple inputs of the output switching device. The paired switching devices act for a selected direction of flow of light through the matrix in relative reciprocal cooperation. Further, the total assembly has reciprocal characteristics and the functions of the initial inputs and final outputs of the complete assembly may be interchanged at will. The intermediate prism device cooperates with the two paired matrix switching systems so that any of a plurality of M inputs lying in a first plane couple to any one of a plurality of N inputs lying in a second plane generally perpendicular to the first plane, as will be discussed relative to FIGS. 7 and 8.

Figure 3:
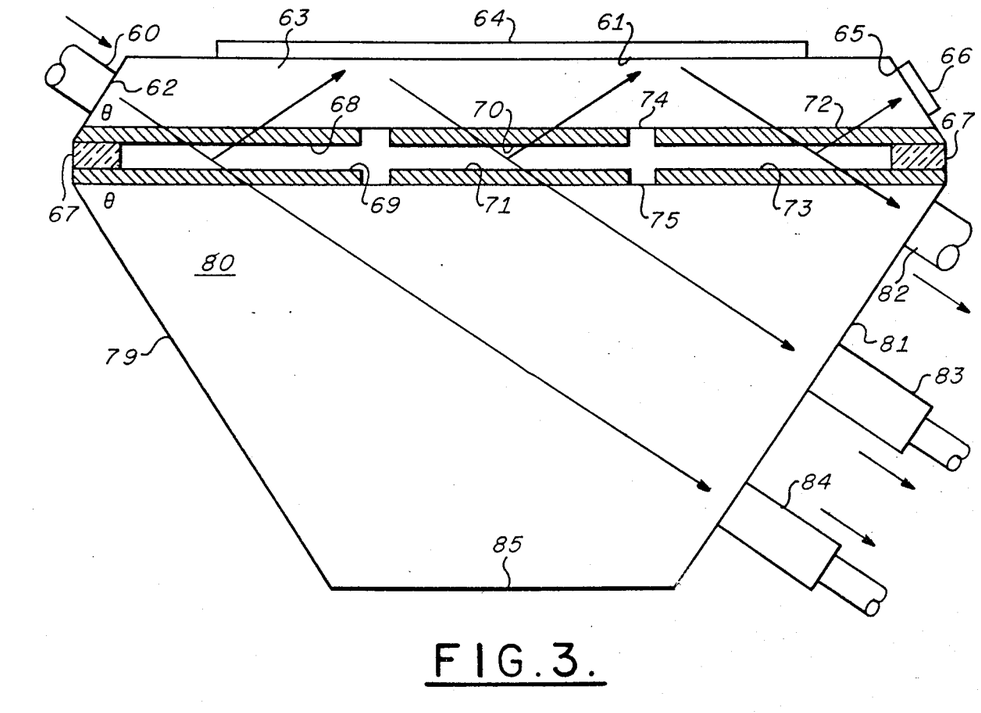
FIG. 3 is a partial cross section view of a prior art switching device.

Typical matrix systems useful as components of the invention are disclosed in the aforementioned patent applications Ser. No. 13,095 and Ser. No. 97,294. Of these, FIG. 15 of Ser. No. 13,095 is illustrated herein as FIG. 3. FIG. 3 represents a symmetric single active layer, multiport switching matrix which may be referred to as a replicated 1×N switch. The economical symmetric structure shown in FIG. 3 employs only one such electrooptically active layer sandwiched between two different prisms 63 and 80. The smaller or upper prisms 63 includes the usual input fiber guide 60 affixed in perpendicular relation to the upwardly slanted input face 62 of prism 63, face 62 lying at an angle $\theta$ with respect to surface 61 of prism 63. The opposite angled face 65 of prism 63 is equipped with an optical absorber 66. Prism 80 is also symmetric, having respective opposed faces 79 and 81 disposed at angles $\theta$ with respect to its parallel faces 75 and 85. A mirror 64 or mirrors are disposed on face 61, although the mirror may be eliminated in some cases and the total internal reflection of the glass-air interface may be used. The angled side 81 is equipped with output guides 82, 83, 84, all disposed in perpendicular relation with respect to the associated angle face 81. The prisms 63, 80 are separated by continuous rectangular gasket 67, as in previously described forms of the invention, for containing a suitable negative or positive anisotropy liquid crystal material. Contiguous with the liquid crystal material, face 74 of prism 63 has three normally similar optically transparent electrodes 68, 70, 72, respectively disposed in opposition to electrodes 69, 71, 73 on face 75 of prism 80. Each independent electrode pair is supplied with conductive leads for electrical excitation. It is readily seen that light signals in inputs 60 may be selectively directed to any of output guides 82, 83, 84, depending upon the selected actuator of the three electrooptic switches.

The versatile matrix of FIG. 3 is seen to use multiple internal reflections from the surface mirror 64 of trapezoidal prism 63 to afford access to pluralities of insertion and tap-off ports. In this configuration, relatively few reflections of a given input light beam are required, either from a fixed mirror such as mirror 64 or from one of the electrooptically active mirrors. In effect, the liquid crystal layer behaves like an optical bus, the electroded areas furnishing active reflection or transmission areas at which the light signal may be selectively put on the effective bus or extracted from it. The unswitched polarization is multiply reflected to absorber 66.

It will be apparent that, for use in an M by N switching matrix, devices like that of FIG. 3 may be individually stacked or replicated in the same pieces of glass, one on top of the other, until the desired number M of inputs is realized, all lying in a plane perpendicular to the drawing and passing through the optical axis of fiber wave guide 60. The M by 3 outputs will likewise lie in planes perpendicular to the drawing with each plane passing through the respective optical axes of fiber wave guides 82, 83, 84. Additional paired electrodes may be supplied on the glass surfaces.

While various types of conventional fiber optic and other light guides may be used to supply the function of light guides used in this invention, such as guide 60, a preferred device is an arrangement in which a collimating or decollimating fiber optic guide element may itself be inserted in a conventional way into a plug or fitting affixed to the associated prism face. By creating and by collecting quasi-collimated light, the collimating-decollimating elements have a beneficial effect in providing lower cross-talk in the switching array, as well as low coupling losses between input and output fibers. Such devices are described in the literature, including the U.S. Pat. No. 3,894,790 to Kobayashi et al. The selected lens preferably has two features for use in the present invention: the lens numerical aperture is greater than the fiber numerical aperture and the lens outside diameter must exceed the fiber cladding diameter. A novel imaging technique is advantageously used in the present invention; specifically, the length L of the graded index rod lens is chosen to be slightly greater than one fourth of the wave guide pitch p:

$$0.252p < L < 0.260 p$$

With a pair of such lenses, an input fiber core is imaged onto an output fiber core with low loss at the 5 to 10 cm. lens-to-lens separations that are encountered in the M by N switching array. By making L slightly larger than p/4, the fiber light beam reaches a focus or minimum diameter in the mid-region between lenses, which facilitates efficient capture of that light by the second microlens. Also of interest are the arrangements of the Holzman U.S. Pat. No. 4,119,362 and of the paper "Microlenses for Coupling Junction Lasers to Optical Fibers", *Applied Optics,* January 1974, page 89, by L. G. Cohen et al. Other conventional devices may be employed. Suitable devices may be purchased under the trade name Selfoc from the Nippon Sheet Glass Company, 3 New England Executive Park, Burlington, Mass. Simply by way of example, it will be assumed that the molecular ordering of FIG. 2A is used in the following discussion, where both polarizations are reflected in the off state and where 50 percent of the unpolarized light is transmitted in the on state. As previously noted, other molecular ordering may well be substituted.

Figure 4:
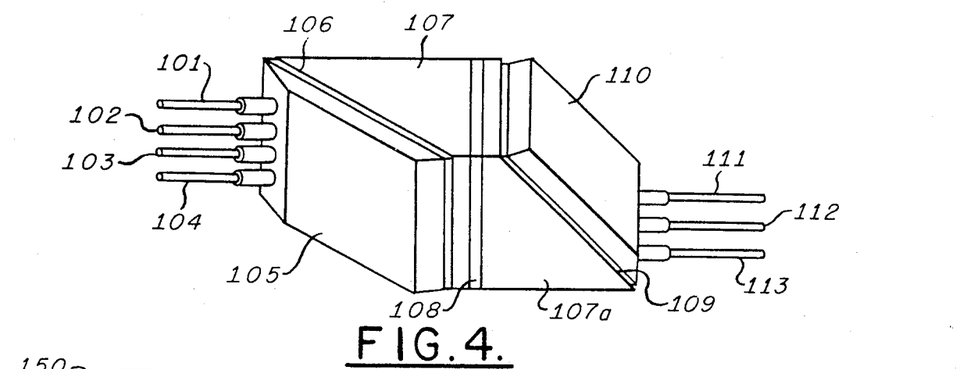
FIG. 4 is a perspective view of a first embodiment of the invention.

Referring now to FIG. 4, a preferred 4 by 3 embodiment of the invention includes a pair of pluralities of the replicated 1 by N switch-prism structures shown in FIG. 3, with the exception that the three fiber optic wave guides 82, 83, 84 are no longer employed. The input switch-prism device 105 employs an array of four fiber optic inputs 101 through 104, each being abutted normal to an inclined face of a transparent glass prism 105 corresponding to prism 63 of FIG. 3. A prismatic element 107, 107a, generally corresponding in function to prism 80 of FIG. 3, cooperates with prism 105 to bound a first liquid crystal cell 106 generally similar to the nematic cell shown between prisms 63 and 80 in FIG. 3.

The FIG. 4 structure is completed by a second or output switch-prism device 110 that employs an array of three fiber optic outputs 111 through 113, each being abutted normal to an inclined face of the transparent prism 110 corresponding to prism 63 of FIG. 3. The prismatic element 107, 107a again cooperates with prism 110 to bound a second liquid crystal cell 109 again generally similar to the nematic cell shown in FIG. 3.

The novel M by N matrix switch thus employs a first set of M switches at 106 of the 1 by N type, the first array, and a second inverse set of M switches at 109 of the 1 by M type, the second array, the latter operating to capture light beams from the first set and to connect the M×N light beams to a one-dimensional array of N outputs 111 through 113. The inverse N-fold replicated 1 by M switch 109 is similar to the replicated input 1 by N switch, except that light propagates in the reverse direction within it. In constructing the novel M by N switch, it is to be considered that light is to be sent from any one of M input fibers 101 through 104 to a particular member of the output fiber group 111 through 113. Thus, from the M by N set of light beams from the input switch 106, it is required to select one beam from each column of that beam array (M columns) and to combine those beams so that they emerge at one particular output of the second or output switch 109, this process being repeated M times. Accordingly, output columns in the M by N array of the input switch 106 must be directed into rows in the M by N input array of the second switch 109.

The desired conformation is accomplished according to the invention by rotating the second or output switch 109 and prism 110 physically 90° with respect to the first switch 106 and prism 105 about an axis generally parallel to the beams in the intermediate prism 107, 107a. Thus, as in FIG. 4, the planes of each of the liquid crystal switches 106, 109 are at oblique angles (67° to 72°) to one side of prism 107, 107a. Beneficially, only two liquid crystal cells and only three glass prisms are required.

Figure 5:
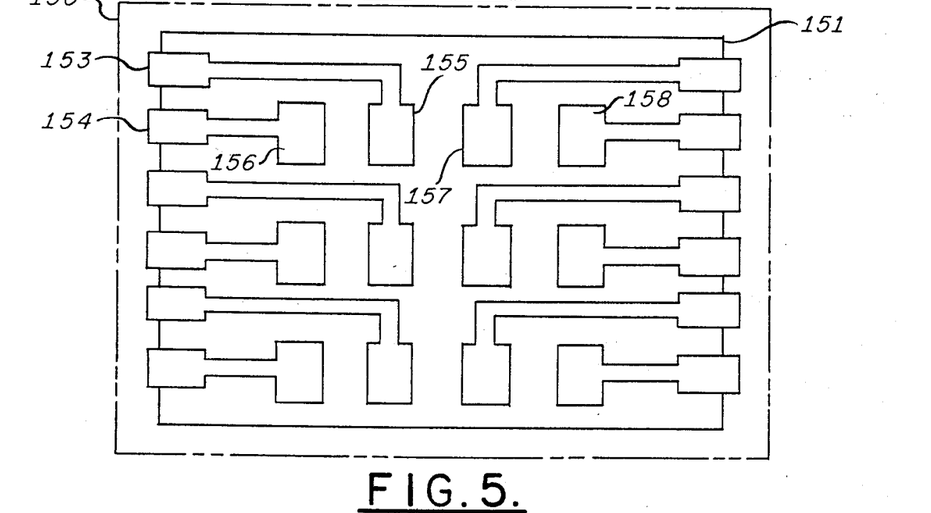
FIG. 5 is a plan view of an electrode system employed in the FIG. 4 device.

Each elemental switching electrode system may comprise a cooperating pair of electrodes as shown at 68, 69 in FIG. 3, or as shown in FIG. 5, a common transparent electrode 150 may be used on the surface of one prism 105 or 107 cooperating with a matrix array of individually excitable transparent electrodes such as electrodes 155, 156 coupled to the respective input terminals 153, 154. In the input switch array 106, the matrix of FIG. 5 is oriented, for example, so that the light beam from input fiber 101 interacts with the electric fields associated with the electrodes in the column headed by electrode 158. Each of the twelve electrically controllable areas for the 3 by 4 matrix illustrated in FIG. 5 has an electrically conductive lead-in path that fans out to a side of a glass prism 105 or 107, each to a tab electrode, such as electrode tabs 153, 154 each electrode tab overhanging its associated prism so that the tabs are accessible to control voltage leads. The leads and transparent electrodes may be formed by a conventional photo-etching or other known process.

The particular programming of the excitations of the individual switching electrodes is not a necessary part of the invention, so that it need not be discussed in any great detail herein. But, by way of example, one may employ the type of CMOS chip powered by a 5 volt battery conventionally used in liquid crystal display watches for the purpose. A total of twelve control wave forms in the audio range is supplied for the 4 by 3 device of FIGS. 4 and 5 (for example, 2 kHz at 30 volts r.m.s.).

Figure 7:
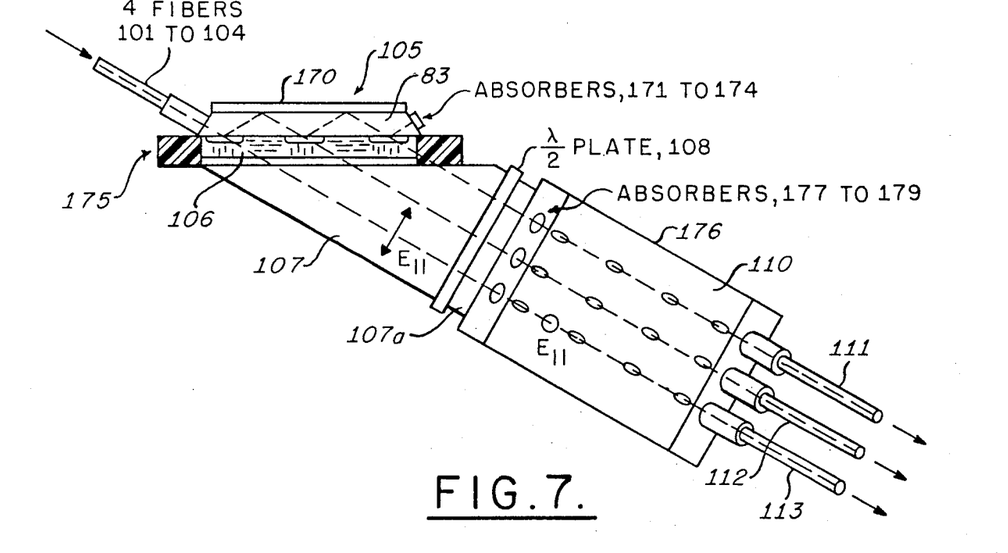
FIGS. 7 and 8 are partial cross section views of the device of FIG. 4.
Figure 8:
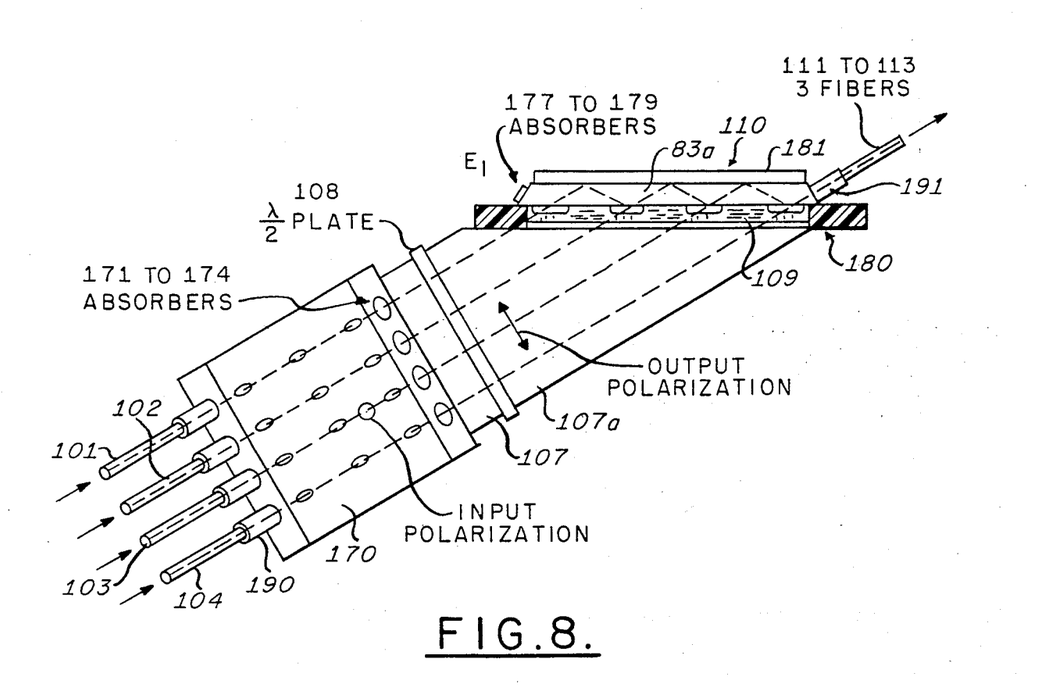

FIGS. 7 and 8 show further details of the structure of FIG. 4; each figure should be examined in each step in understanding the following paragraphs. Light appearing in any of the four inputs 101 through 104 may, according to the control signals applied to the electrodes of switch 106, be transmitted as shown in FIG. 7 through intermediate prism 107, 107a into switch prism 110. If not transmitted in the indicated polarization, it will be multiply reflected in prism 105 into one of the cooperating optical absorbers 171 through 174. Selected ones of the beams in prism 107a will be caused to flow into ones of output fibers 111 through 113.

Figure 6:
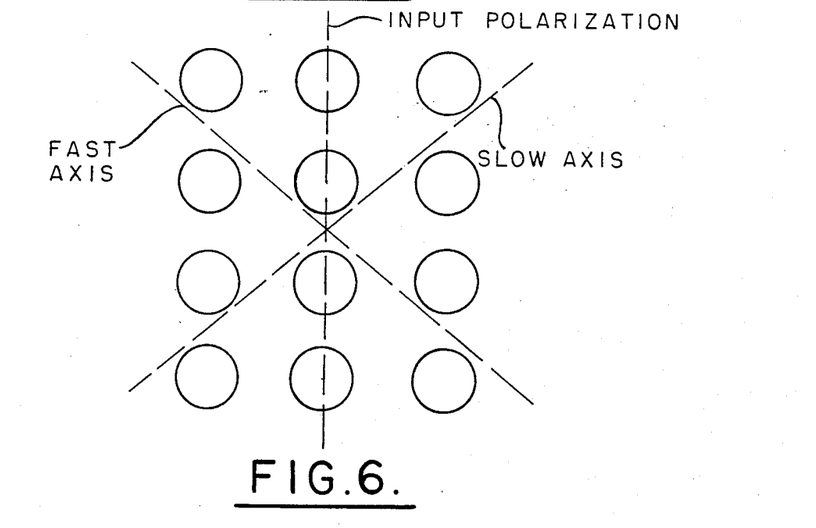
FIG. 6 is a diagram useful in discussing the invention and presenting a cross section view of the light beams.

Only one polarization is switched. Because of the 90° relative angular orientation of the two switch prisms 105, 110, light that emerges as $E\parallel$ polarized from switch prism 105 appears as $E\perp$ polarized in switch prism 110, a polarization that would not be switched in the 110 array assuming the FIG. 2A molecular order. It is therefore necessary actually to divide the intermediate prism 107, 107a into two parts and to interpose a half wave retardation plate 108 between parts 107, 107a, rotating the polarization of each light beam by 90° and thus transforming the $E\perp$ polarization to $E\parallel$ polarization at the second switch prism 110. The orientation of the optical axes of the half wave retardation plate 108 relative to the M by N optical beam positions in the prisms 107, 107a is illustrated in FIG. 6, where the optical polarization direction $E\parallel$ of each light beam in prism 107 is shown. There is a 45° angle between the vibratory plane of each light beam and the retardation plate axis. FIG. 7 indicates how input light at the second switching array 110 is polarized $E\parallel$ for that array; because of this, the second liquid crystal switch can be identical to the first, as in FIG. 2A, and low cross-talk switching is retained because FIG. 2A provides extremely low optical leakage in its off state. The $\lambda/2$ plate 108 introduces no problems, since this phase retarder can be readily purchased as a thin film. It may be affixed to the immediately opposite surfaces of prisms 107, 107a by a conventional optical index-matching cement.

In a further embodiment of the invention, it is found possible to eliminate the need to use the half wave plate 108 and, consequently, prism 107, 107a may be a single unified prism. Plate 108 is no required if the molecular ordering of FIG. 2B or 2C is selected for use in the second switch 109. If the negative anisotropy fluid of FIG. 2B is used, only M of the M by N electrode elements of the 109 array are actuated to transmit the incoming $E\perp$ light. On the other hand, if the FIG. 2C positive anisotropy fluid is used, an inverse addressing is required; that is, all M by N elements of 109 are first excited to reflect $E\perp$ light and then, a selected group of M elements is turned off to transmit incoming $E\perp$ light to the desired M output fibers. The alternative processes may be summarized by the following table:

| 1st Layer | 2nd Layer | $\lambda/2$ Plate | Glass Pieces | LC Anisotropy |
| --- | --- | --- | --- | --- |
| FIG. 2A | FIG. 2A | Yes | 4 | +, + |
| FIG. 2A | FIG. 2B | No | 3 | +, − |
| FIG. 2A | FIG. 2C | No | 3 | +, + |

It will be recognized by those skilled in the art that the invention may be realized in several forms, all of which fall within the scope of the present invention. For example, the 1 by 7 basic switch of FIG. 17 of the aforementioned patent application Ser. No. 13,095 may readily be modified according to the invention to be used in generating a switch analogous to that of FIGS. 7 and 8 of the present application. It will further be understood that the dimensions and proportions suggested by the drawings are not necessarily those that would be chosen by the practitioner; in fact, the illustrated dimensions and proportions are deliberately and properly distorted in the interest of providing clarity in the drawings.

It will be appreciated that the major contribution to insertion loss is the basic liquid crystal switching loss (3 dB.) caused by the fact that the first array switches only half of the unpolarized light. However, that loss is not increased in the second array switch because that array is oriented to switch the first array polarization completely; i.e. to transmit each beam without loss. Fresnel loss is readily minimized by selection of clear index-matching epoxy adhesives or the like at fiber-lens and lens-prism interfaces. Liquid crystal scattering loss is negligible. Unwanted reflections at glass/liquid crystal interfaces are avoided by selecting $n_e = n_g$. Other losses, such as optical coupling losses with respect to the spacing between the collimating-decollimating lenses (such as lenses 190, 191 of FIG. 8) may be controlled by the proper choice of that dimension.

Figure 9:
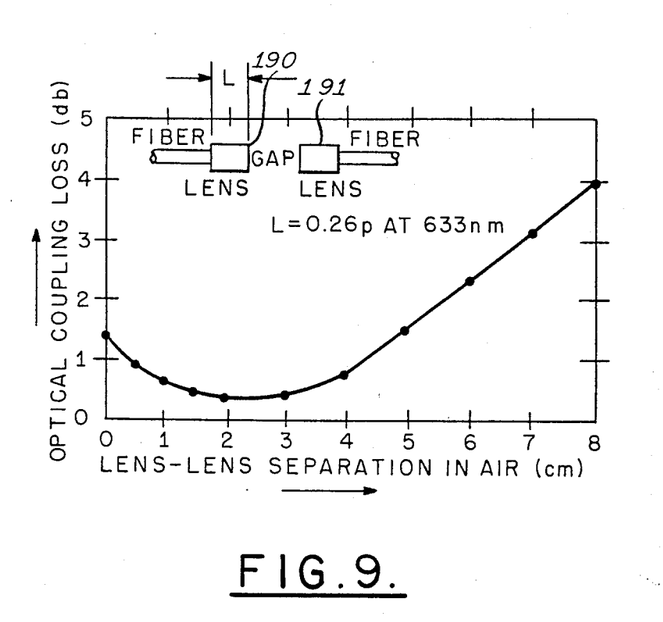
FIG. 9 is a graph useful in explaining one aspect of the invention.

As shown in a particular example set forth in FIG. 9, where $\lambda = 633$ mn., $L = 0.26$ p, 63 $\mu$m core fibers, the optical coupling loss reaches a minimum value of 0.4 dB at a 2.6 centimeter lens-to-lens air gap for a predetermined pair of equal lenses (SLW, 2 mmD); clearly, coupling loss in an M and N matrix is a function of optical path lengths. For the FIGS. 4, 7, 8 switch, the longest optical path therein is: $L_{(max.)} = 2(M+N-2) d \tan\theta \sin\theta$, where d is the thickness of each of prisms 83, 83a atop each liquid crystal cell and $\theta$ is the optical incidence angle (FIG. 3). In the example, $d=2.5$ mm. and $\theta=68°$, so that $L_{(max.)}$ is 5.8 cm. for a 4 by 3 matrix; this must be adjusted in view of the glass index of 1.64. Thus, from FIG. 9, the coupling loss may readily be slightly more than only 1 dB for the example, which is a lower loss than if exact p/4 lenses had been chosen. The sum of the insertion losses may readily be held to about 6 dB. for the typical 4 by 3 switch.

As a further benefit, it is apparent that the novel switch may be quite easily expanded to large M and N values, optical cross-talk and optical insertion loss remaining substantially constant. The level of cross talk is also minimized by coating the exterior walls of the intermediate prism 107, 107a with an optical absorbing substance to prevent multiple reflections of stray light. Because of the high optical isolation of the FIG. 2A material, optical cross talk of $-40$ dB. is conservatively estimated for any configuration of the M by N switching array.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Optical switching means comprising:
   transparent prism means having a rectangular cross section and first and second inclined faces,
   said first inclined face being inclined from a first to an opposed second side of said transparent prism means, and
   said second inclined face being inclined from a third to an opposed fourth side of said transparent prism means,
   first planar liquid crystal matrix switching means at and parallel to said first inclined face for selectively deflecting light from a plurality of optical input means through said transparent prism means along selected paths,
   second planar liquid crystal matrix switching means at and parallel to said second inclined face for selectively deflecting said light into ones of a plurality of optical output means.

2. Apparatus as described in claim 1 wherein said first inclined face lies at an angle between 67° and 72° with respect to said first side of said transparent prism means.

3. Apparatus as described in claim 1 wherein said first, second, third, and fourth sides are coated with an optical absorbing substance.

4. Apparatus as described in claim 1 wherein said first planar liquid crystal matrix switching means includes at least one M by N array of transparent electrically excitable electrode means.

5. Apparatus as described in claim 4 wherein said second planar liquid crystal matrix switching means includes at least one N by M array of transparent electrically excitable electrode means.

6. Apparatus as described in claim 1 wherein half wave retardation plate means is disposed within said transparent prism means in a plane generally perpendicular at least to said first side of said transparent prism means.

7. Apparatus as described in claim 6 wherein the liquid crystal materials of said first and second planar liquid crystal switching means respectively exhibit positive and negative dielectric anisotropy.

8. Apparatus as described in claim 1 wherein the liquid crystal material of said first and second planar liquid crystal switching means both exhibit positive dielectric anisotropy.

9. Apparatus as described in claim 8 wherein said second inclined face lies at an angle between 67° and 72° with respect to said second side of said transparent prism means.

10. Apparatus as described in claim 8 wherein the extraordinary refractive index of said liquid crystal material is substantially equal to the index of refraction of said transparent prism means.

11. Apparatus as described in claim 1 wherein said plurality of optical input means includes a first planar array of fiber wave guide means.

12. Apparatus as described in claim 11 wherein said plurality of optical output means includes a second array of fiber wave guide means lying in a plane substantially perpendicular to said first planar array of fiber wave guide means.

13. Apparatus as described in claim 11 wherein said optical input means comprises first fiber optic wave guide means coupled to said first planar liquid crystal matrix switching means through rod collimating lens means.

14. Apparatus as described in claim 13 wherein said optical output means comprises second fiber optic wave guide means coupled to said second planar liquid crystal matrix switching means through rod decollimating lens means.

15. Apparatus as described in claim 14 wherein said rod collimating and decollimating lens means each have an axial length L which is $0.252 \, p < L < 0.260 \, p$ where p is the fiber optic wave guide pitch.

* * * * *